United States Patent [19]

Lando

[11] Patent Number: 4,624,761

[45] Date of Patent: Nov. 25, 1986

[54] POLYMERIC MATERIAL COMPOSED OF SHEETS OF POLYDIACETYLENE AND POLYACETYLENE CHAINS

[75] Inventor: Jerome B. Lando, Shaker Heights, Ohio

[73] Assignee: Case Western Reserve University, Cleveland, Ohio

[21] Appl. No.: 563,952

[22] Filed: Dec. 21, 1983

[51] Int. Cl.$^4$ .............................................. C08F 2/46
[52] U.S. Cl. ........................................ 524/80; 526/285; 524/408; 524/439; 252/500; 252/512; 252/518; 525/328.1; 525/356; 525/367; 522/186
[58] Field of Search ................. 526/285; 252/500, 512, 252/518; 204/159.22

[56] References Cited

U.S. PATENT DOCUMENTS 4,220,747 9/1980 Preziosi et al. ...................... 526/285
4,411,826 10/1983 Naarmann et al. ................. 526/285

FOREIGN PATENT DOCUMENTS 0021695 1/1981 European Pat. Off. ............ 526/285
429068 10/1974 U.S.S.R. .............................. 526/285

OTHER PUBLICATIONS

Journal of Polymer Science: Polymer Letters Edition, vol. 19, No. 5 227-233, May 1981.
S. Sofia et al., Science 204, 1306 (1979), "Physics Today".

Primary Examiner—Joseph L. Schofer
Assistant Examiner—J. M. Reddick
Attorney, Agent, or Firm—Fay, Sharpe, Fagan, Minnich & McKee

[57] ABSTRACT

An undoped semiconducting polymeric material is provided which is composed of a plurality of parallel sheets of regular two dimensional networks of polydiacetylene and polyacetylene chains interconnected by a plurality of spacer units. In the preferred embodiment the spacer units are methylene with the number of methylene units ranging from 5 to 8. The polymeric material is preferably formed by polymerizing a monomer having the structural formula $CH\equiv C-(CH_2)_n-C\equiv C-C\equiv C-(CH_2)_n-C\equiv CH$. In the preferred embodiment n has a value of 5 to 8.

5 Claims, 2 Drawing Figures

POLYMERIC MATERIAL COMPOSED OF SHEETS OF POLYDIACETYLENE AND POLYACETYLENE CHAINS

The Government has rights in this invention pursuant to Contract N00014-77-C-0215 awarded by the Department of the Navy.

BACKGROUND OF THE INVENTION

The present invention relates to conductive polymeric materials and a means of producing the same.

More specifically, the instant invention concerns an undoped semiconducting polymeric material which is composed of a plurality of parallel sheets of regular two-dimensional networks of polydiacetylene and polyacetylene chains interconnected by a plurality of spacer units. In the preferred embodiment the spacer units are composed of a plurality of methylene units, with the number of such units ranging from 5 to 8. The polymeric material is preferably formed by polymerizing a monomer having the structural formula HC≡C—(CH$_2$)$_n$—C≡C—C≡C—(CH$_2$)$_n$—C≡CH, wherein n has a value of 5 to 8.

It is well known in the art that certain acetylenic compounds can be rendered conductive by means of doping. For example, it is known that various polyacetylenes can be doped with certain materials, such as iodine, to cause them to exhibit a reasonable degree of conductivity.

However, the prior art is devoid of any teaching or suggestion as to how to produce a conductive polymerized undoped acetylenic material (as used herein the term conductive is meant to include semiconductive).

Accordingly, it is the principal object of the present invention to provide an acetylenic polymeric material which is characterized by its relative high degree of intrinsic electrical conductivity.

Another object of the invention is to provide a method of producing an acetylenic polymeric material which is characterized by its relative high degree of intrinsic electrical conductivity.

These and other objects of the present invention will become apparent to those skilled in the art from a reading of the following specification and claims.

SUMMARY OF THE INVENTION

In one aspect, the present invention relates to a unique semiconducting polymeric material which is composed of a plurality of parallel sheets of regular two-dimensional networks of polydiacetylene and polyacetylene chains interconnected by a plurality of spacer units. Such spacer units may be any structure which permits the monomer to react in such a fashion that the resultant polymerized material is composed of a plurality of parallel of sheets or layers of polydiacetylene and polyacetylene chains interconnected by the spacer units. In the preferred embodiment the spacer units are methylene. However, it is possible to substitute a sulfur or oxygen atom for a carbon atom in at least one methylene spacer unit. In the preferred practice of the invention, the number of methylene units ranges from 5 to 8.

In still another aspect, the instant invention relates to a method for producing an undoped semiconducting polymeric material which is composed of a plurality of parallel sheets of regular two-dimensional networks of polydiacetylene and polyacetylene chains interconnected by a plurality of ethylene units.

This method comprises providing a monomer having the structural formula HC≡C—(CH$_2$)$_n$—C≡C—C≡C—(CH$_2$)$_n$—C≡CH, and polymerizing the monomer to produce a polymerized material which is composed of a plurality of parallel sheets of regular two-dimensional networks of polydiacetylene and polyacetylene chains interconnected by a plurality of methylene units.

In still a further embodiment of the invention an undoped semiconducting material is produced by (a) dimerizing a monomer having the structural formula HC≡C—(CH$_2$)$_n$—C≡CH, wherein n is 5 to 8; and (b) polymerizing the so-obtained dimer to produce a polymerized material which is composed of a plurality of parallel sheets of regular two-dimensional networks of polydiacetylene and polyacetylene chains interconnected by a plurality of methylene units, with the number of methylene units ranging from 5 to 8.

BRIEF DESCRIPTION OF THE PREFERRED EMBODIMENTS OF THE INVENTION

Figure 1:
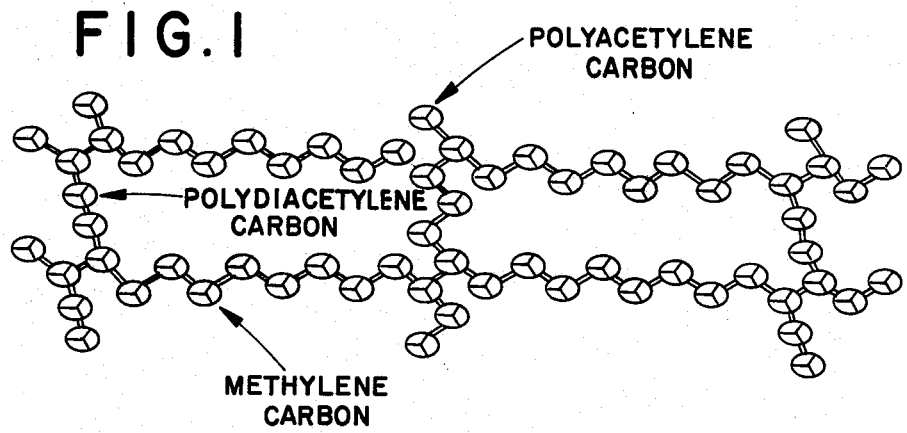
FIG. 1 is an ac section of polymerized monomer having the formula HC≡C—(CH$_2$)$_8$—C≡C—C≡C—(CH$_2$)$_8$—C≡CH (hydrogen atoms with the polyacetylene added (methylene hydrogens not shown)

In practice, any monomer having the structural formula HC≡C—(CH$_2$)$_n$—C≡C—C≡C—(CH$_2$)$_n$—C≡CH can be used to produce the undoped semiconducting polymeric material of the instant invention. All that is required is that it be able to polymerize when subjected to conventional polymerizing procedures to produce a polymeric material which is composed of a plurality of parallel sheets of regular two-dimensional networks of polydiacetylene and polyacetylene chains interconnected by a plurality of methylene units.

In the preferred practice of the invention the monomer has the structural formula HC≡C—(CH$_2$)$_n$—C≡C—C≡C—(CH$_2$)$_n$—C≡CH wherein n ranges from 5 to 8. The resultant preferred polymeric material has a monoclinic cell unit which is composed at y=0 & ½ of regular two-dimensional networks of polydiacetylene and polyacetylene chains interconnected by a plurality of methylene units, with the number of methylene units ranging from 5 to 8.

Polymerization of the dimer can be accomplished by conventional means. Such techniques include exposing the dimer to radiation (γ-rays, x-rays, UV or visible) or thermal annealing to initiate polymerization.

The following is an example of the practice of the invention:

Monomers of 1,11 dodecadiyne were oxidatively coupled using a copper-pyridine catalyst. Pyridine (14 ml), ethanol (14 ml) and cupric chloride (10 g) were added to a three-necked flask. After dissolution, the monomer was added (0.025 mole) and the resulting mixture was stirred and heated in the presence of air at 75° C. After 4 hours the temperature was increased and the reaction mixture was refluxed for an additional hour. After acidification with an aqueous HCl solution, the reaction product was extracted with chloroform and washed several times with water. The chloroform was removed at reduced pressure and at room temperature. The dimer was separated from the reaction product and crystallized. A low molecular weight material (dimer) was obtained having the molecular formula

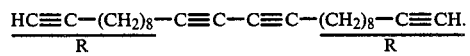

The dimer was used as a monomer for a subsequent diacetylene polymerization initiated by $Co^{60}$ γ-irradiation.

Microscopic single crystals of the dimer were obtained from a hexane solution of the mixture at 4° C. Electron diffraction patterns from these crystals have been recorded for different dosages of γ-irradiation and consequent diacetylene polymerization. This diffraction analysis was very useful for studying transitions in the course of the diacetylene polymerization. A distinct intermediate between the monomer and the polymer has been observed for a range of conversation. Before polymerization the b*c* lattice net is orthogonal. In the intermediate stage the intensity distribution changes considerably, as does the monoclinic angle (a). In the final or completely polymerized phase, however, the b*c* lattice net is orthogonal. The observed intermediate may be a solid solution of the monomer in polymer or the polymer in monomer. The structure in the intermediate appears to be considerably disordered, resulting in diffuse peaks in the diffraction pattern. In the initial (monomer) the the final (polymer) phases, however, the lattice distortions are negigible and consequently the diffraction maxima are sharp. The unit cells corresponding to the different phases are given in Table 1. A more accurate unit cell for the polymerized dimer as determined from X-ray measurement is given in Table 2, along with other crystal data.

TABLE 1

Unit Cell Dimensions of the Different Crystalline Phases of Dimer

| Crystal phase | a(Å) | b(Å) | c(Å) | o |
|---|---|---|---|---|
| Dimer monomer (before irradiation) | 28.25 | 7.15 | 5.24 | 101.5° |
| Intermediate | Unknown | 7.92 | 5.12 | 96.2° |
| Polymerized (to completion) | Unknown | 8.21 | 4.93 | 90.0° |

TABLE 2

Crystal Data of the Polymer

| Crystal system: | Monoclinic |
|---|---|
| Space group: | $P_{2/n}$; z = 2 |
| Lattice parameters: | a = 26.779(8)Å |
| | b = 8.254(10)Å;b = 8.21Å ⎫ Electron |
| | ⎬ Diffrac- |
| | c = 4.906(6)Å;c = 4.93Å ⎭ tion |
| | Y = 119.558(12)° |
| Unit cell volume: | v = 943.26Å$^3$ |
| Mol. wt. of a repeat: | M = 344 g/mole |
| Calculated density: | $d_c$ = 1.133 g/cm$^3$ |
| Measured density: | $d_m$ = 1.12 g/cm$^3$ |
| Mass absorption coefficient: | μ = 1.33 cm$^{-1}$ |

X-Ray Experiment

A well-formed plate-like polymerized crystal of dimensions 0.5×0.05×1.5 mm was chosen for X-ray data collection. Preliminary Weissenberg and oscillation photographs indicated that it crystallizes in a monoclinic system with the chain axis (unique axis) lying along the long edge of the crystal plate. The intensity data were collected using an automated Syntex $P2_1$ four circle diffractometer operating with a graphite monochromator and $MoK_a$ radiation (λ=0.71073Å). Accurate unit cell dimensions and the orientation matrix were calculated from the least squares refinement of the angular positions of twenty higher order reflections. The intensity of three standard reflections (117, 3-31 and 66-2) was periodically monitored after each 50 reflections to check the crystal and the diffractometer stability. No significant deviation in intensity was observed. The data were collected by an ω-scan technique at rates varying from 1.5 to 4.0° min$^{-1}$, such that more time was devoted to less intense reflections. A total of 5278 data points ranging from h= −14 to 0, k= −10 to 19, and l=0 to 13 were collected. No absorption correction was applied because the mass absorption coefficient was 1.33 cm$^{-1}$ and a side scan (φ scan) over a few reflections showed no significant deviation in intensities. Lorentze and polarization corrections were applied. Reflections with intensities greater that 2.5 times the corresponding standard deviation were counted as observed. The total number of observed reflections was 926. The refinement of the structure was accomplished with these data points. The agreement between the observed and the calculated structure factors was characterized by the reliability index or residual:

$$R = \frac{E/F_o - F_c}{\Sigma F_o}$$

The structure was solved essentially by a trial method. Additional information from various other sources was particularly useful in this attempt. Structures of similar materials have been solved by the applicant, as well as by others. A comparison with all these known structures and crystal data faciliated the initial steps towards the solution. The unit cell dimensions provided the preliminary information regarding the orientation of the chains and the side groups. The c-axis perfectly matches the diacetylene chain repeat so the diacetylene backbone should be oriented along the c-axis. The a-repeat is approximately twice the length of the side group $(CH_2)_8$—C≡CH, for an all-trans conformation. Therefore it was a reasonable assumption that the side groups should be oriented along the a-axis. There are two chains per unit cell and a glide plane perpendicular to the c-axis. Thus one chain should run through the center of the ab plane. The unit cell being monoclinic (c-axis unique), the side group orientation, if assumed along the a-axis, is perpendicular to the main polymer backbone. The perpendicular distance between the two neighboring side groups (planar zigzag) is a little more than 4Å, in close agreement with the packing of polyethylene chains. Based on all these internally consistent logical justifications, a preliminary model was constructed where the polymer backbone was placed along the c-axis and the side chains along the a-axis. Several other models with minor and major modifications of this preliminary one were also investigated. Calculations were made on a VAX 780 computer.

Figure 2:
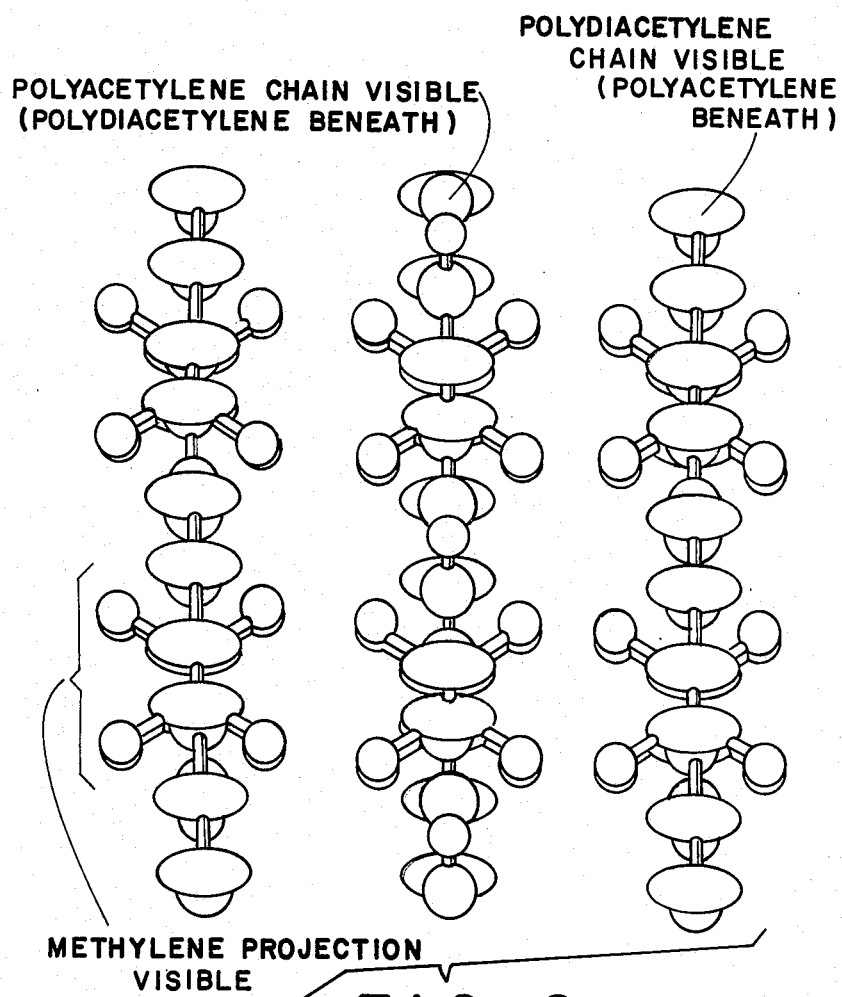
FIG. 2 is a bc projection of a polymerized monomer having the formula HC≡C—(CH$_2$)$_8$—C≡C—C≡C—(CH$_2$)$_8$—C≡CH.

Initially the linked atom least squares (LALS) program originally developed by S. Arnott and co-workers was used with a hundred randomly selected reflections for a preliminary refinement of the bond angles, dihedral angles and the overall isotropic temperature factor. The minimum residual obtained from this refinement was 21%. The existing bad contacts were minimized by varying the orientation of the terminal acetylene groups, which subsequently led to a residual of 19%. The calculated coordinates from the LALS output were subsequently used for a full matrix least squares refinement over all 926 observed reflections. The starting residual was found to be 35%. A free variation of the coordinates of all the carbon atoms decreased it to 19% in a few cycles. The individual isotropic temperature factors were subsequently varied and the hydrogen atoms added to the carbons. The resulting residual was 12%. At this point a problem was apparent. The terminal acetylene hydrogens of the two consecutive molecules in the unit cell were found to be too close together. The hydrogen of one seemed to be almost overlapping with the carbon of the other. This difficulty was eliminated by considering the possiblity of a chemical (addition) reaction among the acetylene groups through the high energy photo-initiation ($\gamma$-ray) and the consequent formation of a polyacetylene backbone parallel to the c-axis. The calculated coordinates of the acetylene carbons from the structure refinement were in close agreement with that corresponding to a trans polyacetylene chain. The hydrogen atom position was now shifted sideways by 120°. The ideal coordinates for this hydrogen atom, appropriate to a polyacetylene chain, were calculated separtely and incorporated for refinement. The final residual after refining the anisotropic temperature factors was found to be 0.08%. The polyacetylene carbon atoms were restricted to isotropic (spherical) temperature factors because their refined anistropic (ellipsoidal) temperature factors were too elongated along the chain direction without any significant improvement of the residual. The ac and the bc projections are given in FIGS. 1 and 2. Half of the unit cell with no hydrogen atoms is shown in the ac projection for clarity. The deviation of the carbon atom positions from the ac plane ($\vec{b}=0$) are given in Table 3, which indicates that the deviations are within experimental error. All the non-hydrogen atoms are essentially coplanar in the ac plane.

TABLE 3

Deviation of the Atom Positions From the ac Plane

| Atom | Deviation (Å) from the ac Plane (y = 0) | r.m.s. Deviation (Å) |
|---|---|---|
| C1 | −.0030 | 0.021 |
| C2 | −.0318 | |
| C3 | −.0331 | |
| C4 | 0.0107 | |
| C5 | −.0179 | |
| C6 | 0.0263 | |
| C7 | −.0000 | |
| C8 | 0.0332 | |
| C9 | 0.0092 | |
| C10 | 0.0268 | |
| C11 | 0.0025 | |
| C12 | −.0229 | |

The final structure is composed of sheets at y=0 & $\frac{1}{2}$b of regular two-dimensional networks of polydiacetylene and polyacetylene chains interconnected by eight methylene units (the planar zigzag). The interplanar distance is approximately 4Å. The bond lengths along the diacetylene direction are consistent with the acetylenic form.

One of the most important results of this structure analysis is the measurement of bond lengths among the polyacetylene carbons. This is the first time that polyacetylene bond lengths have been experimentally determined. (See Table 4) There are additional important physical porperties deducible from the structure. As mentioned earlier and shown in the ac projection, the structure is composed of sheets of polydiacetylene and polyacetylene chains, lying parallel to the ac plane. The second layer of atoms or the sheet in the middle of the unit cell is lying $\frac{1}{2}(\vec{a}+\vec{b})$ away from the original sheet at the ac plane. Consequently, the polydiacetylene and the polyacetylene chains are only 4Å apart along the b-direction. A considerable overlap between these chains may be expected. In addition to the $\pi$ overlap among the polyacetylene carbons, this interchain overlap may lead to a high electrical conductivity. The results of the preliminary investigations of its conducting properties are presented below.

TABLE 4

Bond Lengths Along the Diacetylene and the Polyacetylene Directions

| | Bond Length (Å) Along | |
|---|---|---|
| Bond Type | Polydiacetylene Chain | Polyacetylene Chain |
| C—C | 1.451(10) | 1.463(9) |
| C=C | 1.359(9) | 1.357(13) |
| C≡C | 1.248(6) | |

A two-point measurement of the conductivity of polymerized dimer of 1,11-dodecadiyne was made on three single crystals, approximately 1.6 mm long along the chain direction (c-axis). The single crystals were too small for a four-point measurement. In order to make a four-point measurement, the material was crystallized in the form of large spherulites (diameter~1 cm). Initially a two-point measurement was made on these spherulites by placing the contact points diametrically across. An optical birefringence test indicated that the polymer chains were approximately radially oriented in the spherulites. The spherulitic samples were subsequently collected and compressed in the form of a film, suitable for a four-point measurement. A digital electrometer with range from $10^{-11}$ to $10^{-1}$ amp was used for the current measurement and the voltage was recorded by a digital Keithly multimeter. The experiment was repeated from time to time for 2–3 months and no significant decay of conductivity was noticed. A preliminary study of the temperature dependence of the conductivity showed that the conductivity falls with decrease of temperature. At liquid nitrogen temperature (−196° C.) the conductivity was too low to be measured ($<10^{-7}\Omega^{-1}\text{cm}^{-1}$) on our apparatus.

The conductivity from the two-point measurements on the single crystals was approximately $10^{-2}\Omega^{-1}\text{cm}^{-1}$ along the chain direction (long edge). The actual conductivity should, however, be higher than this observed value because in a two-point measurement the contact resistance is not eliminated. Thus the observed resistance was higher than the actual. The spherulitic samples also exhibited a similar value of conductivity for two-point measurement. The I-V characteristics from the four point measurement were linear or ohmic at room temperature and the calculated conductivity was approximately $2\times10^{-2}\Omega^{-1}\text{cm}^{-1}$. Since the four point measurement was not made on a single crystal, the measured value is a resultant over somewhat different chain orientations. Comparison of the conductivities of the oriented ($>10^{-2}\Omega^{-1}\text{cm}^{-1}$) and pressed spherulite ($\sim2\times10^{-2}\Omega^{-1}\text{cm}^{-1}$) samples shows that the degree of anisotropy in conductivity is probably not very large. The remarkable stability of the conductivity indicates that the material is not significantly susceptible to oxidation in air or the attack of water. The decrease of conductivity with a decrease in temperature is a characteristic of a semiconducting material. Therefore the polymerized dimer may be classified as the first good (low band gap) organic semiconductor undoped.

The electrical properties of a crystalline material depend upon its electronic structure, and ultimately on the chemical constitution of its repeat unit. Therefore to elucidate the electrical properties of the polymerized dimer our study of its crystal structure was coupled with an investigation into its structure-conductivity relationship. As described previously, the polymerized dimer is composed of sheets of alternating polydiacetylene and polyacetylene backbones. The nearest neighbor distance between a polydiacetylene and polyacetylene chain is 4Å along the b-direction. All chains have a planar conformation with the planes parallel to the ac surface. Geometrically the $p_z$ orbitals of the backbone carbons are directed approximately along the b-axis. Thus the chains in neighboring sheets (4Å apart) along the b-axis should have a considerable $\pi$-electron overlap and this overlap is probably responsible for the high conductivity. Originally polyacetylene has a conductivity of less than ($10^{-5}\Omega^{-1}cm^{-1}$) and polydiacetylene has less ($\sim 10^{-7}\Omega^{-1}cm^{-1}$), But in the specific system of the polymerized dimer, the systematic coupling of the two linear chains in a regular lattice enhances the conductivity by more than 3 orders of magnitude. The coupling acts like a dopant intercalated between the chains. The interchain distance in the a-direction being much larger ($\sim 13.5$Å), the conductivity along the a-axis should be lower than that in the b- and c-directions. Yet the overall anisotropy in conductivity should not be too high.

The $\pi$-electron band structure of this material was analyzed using Huckel formulation and the effective band gap was calculated as a function of the interchain coupling. The band gap, as estimated is approximately 0.7 ev.

It will be appreciated by those skilled in this art that in the practice of the invention 0 or S atoms may be used to replace $CH_2$ groups in the methylene units. Accordingly, it is intended to include such resulting polymers within the scope of the present invention.

Also, it should be pointed out that polymers produced according to the present invention can have their electrical properties further enhanced by doping such polymer with conventional doping agents such as iodine, $AsF_5$, Li, Na or mixtures thereof.

From the foregoing, it is clear that the instant invention provides a polymeric material having unique semiconducting properties. To those skilled in the art applications for such material are readily apparent and include low temperature heating, conductors for storage batteries and the like.

While there have been described what are at present considered to be the preferred embodiments of this invention, it will be obvious to those skilled in the art that various changes and modifications may be made therein without departing from the invention, and it is, therefore, intended in the apprended claims to cover all such changes and modifications as fall within the true spirit and scope of the invention.

What is claimed is:

1. A polymeric material which in the undoped state is semiconducting which is composed of a plurality of parallel sheets of regular two-dimensional networks of polydiacetylene and polyacetylene chains interconnected by a plurality of methylene units, with the number of methylene units ranging from 5 to 8, and with said polymeric material having been formed by polymerizing a monomer having the structural formula
$HC \equiv C-(CH_2)_n-C \equiv C-C \equiv C-(CH_2)_n-C \equiv CH$
wherein n has a value of 5 to 8, with said polymerization being effected by means of gamma rays or UV irradiation.

2. The polymeric material of claim 1, which in the undoped state is semiconducting, wherein the plurality of sheets of polydiacetylene and polyacetylene chains have a monoclinic unit cell.

3. The polymeric material of claim 1, which in the undoped state is semiconducting, wherein the distance between adjacent chains of polydiacetylene and polyacetylene is about 4Å.

4. The polymeric material of claim 1, which in the undoped state is semiconducting, wherein at least one carbon atom in at least one interconnecting methylene unit has been replaced by an atom selected from the group consisting of sulfur and oxygen.

5. The polymeric material of claim 1, which in the undoped state is semiconducting, which further includes a doping agent selected from the group consisting of iodine, $AsF_5$, Li and Na.

* * * * *